United States Patent Office 2,878,277
Patented Mar. 17, 1959

2,878,277

PRODUCTION OF ADIPONITRILE

Joseph M. Estes, Jr., Niagara Falls, N. Y., assignor to E. I. du Pont de Nemours and Company, Wilmington, Del., a corporation of Delaware No Drawing. Application May 6, 1957
Serial No. 657,032

5 Claims. (Cl. 260—465.8)

This invention relates to the manufacture of adiponitrile. More particularly, it relates to the manufacture of adiponitrile by the cyanation of 1,4-dichlorobutane using preformed adiponitrile as a solvent for the reaction mixture.

It has heretofore been proposed, as in German Patent 881,340 (1953), to carry out the cyanation of 1,4-dichlorobutane in anhydrous adiponitrile. It has also been proposed to utilize aqueous adiponitrile as the solvent for the cyanation reaction. While good yields may be obtained from such processes, especially from those accomplishing the reaction using adiponitrile in the presence of water, it still remains desirable to increase the yields and, more particularly, to repress the formation of by-products.

A major object of this invention is, therefore, generally to improve prior art processes for the cyanation of 1,4-dichlorobutane in adiponitrile. Another object of the invention is to improve the yield obtainable when the cyanation of 1,4-dichlorobutane is carried out using aqueous adiponitrile as the cyanation solvent. A further object of the invention is to repress the formation of by-products in the cyanation of 1,4-dichlorobutane.

The above-mentioned and still further objects of the invention may be accomplished by a procedure in which prior art processes are modified by the inclusion of hydrogen cyanide as an additive in the reaction mixture. Hydrogen cyanide may be added as liquid, gas or aqueous solution. The quantity of hydrogen cyanide used may range from an amount equivalent to 0.5 to 20% of the weight of sodium cyanide. The preferred amount is in the range 1.0 to 10.0% by weight of sodium cyanide.

The presence of hydrogen cyanide in the amounts specified in the process of this invention raises the net yield of adiponitrile produced by the reaction of 1,4-dichlorobutane and sodium cyanide and lowers losses due to the formation of tar and other reaction by-products. Excess hydrogen cyanide over the range specified is undesirable resulting in decreased yields and production of hydrogen cyanide polymers which contribute to the tarry by-product. Use of less than 0.5% hydrogen cyanide produces no appreciable increase in yield or reduction in by-product formation.

By-products, as here defined, do not include the intermediate chlorovaleronitrile, $Cl(CH_2)_4CN$, which can be recycled and converted to adiponitrile on complete reaction with sodium cyanide. By-products are reported as tar and cyanobutyl derivatives other than chlorovaleronitrile, viz. cyanobutanol, cyanobutyl formate and cyanobutyl ethers. The yield of adiponitrile is the net yield as represented by the percent of dichlorobutane not converted to tars or cyanobutyl derivatives other than chlorovaleronitrile.

The invention will be understood in greater detail from the following examples.

EXAMPLE 1

This example illustrates the results obtained in the absence of hydrogen cyanide as an additive and is given for purposes of comparison. This preparation was carried out using adiponitrile and aqueous sodium cyanide as described in U. S. Patent 2,786,072 (March 19, 1957).

A 35% aqueous solution of sodium cyanide was added with stirring to a 40% by weight solution of 1,4-chlorobutane in adiponitrile. A slight excess of sodium cyanide was employed, the total approximating 111% of the theoretical. The reaction temperature was 140° C. and the pressure was 760 mm. Excess water was allowed to distill from the reaction mixture in the manner shown in the aforesaid patent reference. The net yield of adiponitrile was 88.1%. By-products included 6.5 lbs. of cyanobutyl derivatives and 7.0 lbs. of tar for each 100 lbs. of adiponitrile produced.

EXAMPLE 2

This example shows the effect of adding hydrogen cyanide equivalent to 15% by weight of the sodium cyanide to the adiponitrile process of Example 1. In this case, the sodium cyanide was employed in amount equivalent to approximately 116% of the theoretical. The net yield of adiponitrile was 96.3% of the theoretical. By-products per 100 lbs. of adiponitrile produced amounted to 1.6 lbs cyanobutyl derivatives and 2.3 lbs. tar.

EXAMPLE 3

Two adiponitrile preparations similar to those of Example 1 were carried out in which gaseous hydrogen cyanide and 50% aqueous sodium hydroxide were fed to the reactor. Sufficient sodium hydroxide was employed to give a 33% excess of sodium cyanide. In Experiment A, the amount of hydrogen cyanide employed was such as to leave 1% unreacted sodium hydroxide whereas in Experiment B, the hydrogen cyanide was about 150% of theoretical amount required to react with the alkali. This would leave excess hydrogen cyanide equivalent to about 27 to 28% of the sodium cyanide. Results are summarized in Table I.

Table I

| Experiment | A (Excess NaOH) | B (Excess HCN) |
|---|---|---|
| Yield of Adiponitrile | 65.8 | 92.6 |
| By-Products (Lbs./100 lbs Adiponitrile): | | |
| Cyanobutyl Derivatives | 2.2 | 0.8 |
| Tar | 49.0 | 7.2 |

The tar present in Experiment B differed from that obtained in Experiment A in that it consisted principally of hydrogen cyanide polymers.

This example shows that excessive hydrogen cyanide is undesirable principally because it leads to the formation of hydrogen cyanide polymers. However, even under these conditions the formation of cyanobutyl by-products is reduced and yields are superior to those obtained with excess sodium hydroxide.

EXAMPLE 4

Adiponitrile was prepared continuously by reaction of aqueous sodium cyanide with an approximately 26% solution of 1,4-dichlorobutane in adiponitrile at 145° C. Hydrogen cyanide equivalent to 2.8% of the sodium cyanide was maintained by feeding a 10% solution in water. The average hold-up time in the reactor was about one hour. Table II summarizes data obtained by analyzing the product solution after 5, 19 and 25 hours.

Table II

| Time of Sample, Hrs. | Adiponitrile Yield, Percent by Weight | By-Product as Lbs./100 Lbs. ADN | |
|---|---|---|---|
| | | Cyanobutyl Derivatives | Tar |
| 5 | 96.1 | 2.7 | 1.4 |
| 19 | 95.6 | 3.4 | 1.1 |
| 25 | 96.4 | 2.3 | 1.3 |

In the practice of this invention, conditions of temperature and pressure may approximate closely those shown by the aforesaid patent, U. S. 2,786,072 (March 19, 1957), but are not restricted thereto. However, the invention may be used generally by addition of hydrogen cyanide in any process for the production of adiponitrile by reaction of sodium cyanide with 1,4-dichlorobutane. Preferably, however, atmospheric pressure and a temperature of 130°–150° C. is utilized. It is also preferred that excess water be removed from the reaction mixture by the flash reaction technique, but employment of this technique is not essential.

Having described my invention, I claim:

1. In the process for making adiponitrile by the reaction of 1,4-dichlorobutane with sodium cyanide in a reaction solvent comprising adiponitrile, the improvement comprising carrying out the said reaction in the presence of hydrogen cyanide in quantity equivalent to 0.5 to 20% the weight of sodium cyanide.

2. The process of claim 1 in which the hydrogen cyanide is equivalent to 1 to 10% the weight of sodium cyanide.

3. The process of making adiponitrile which comprises reacting 1,4-dichlorobutane dissolved in adiponitrile with an aqueous solution of sodium cyanide in the presence of hydrogen cyanide equivalent to 0.5 to 20% the weight of sodium cyanide at atmospheric pressure and a temperature of 130–150° C.

4. The process of claim 3 in which the hydrogen cyanide is equivalent to 1 to 10% the weight of sodium cyanide.

5. The process of making adiponitrile which comprises reacting 1,4-dichlorobutane dissolved in adiponitrile with an aqueous solution of sodium hydroxide and hydrogen cyanide in substantial excess over the theoretical amount required to react with the alkali so that the reaction mixture will contain hydrogen cyanide equivalent to from 0.5% to about 20% of the sodium cyanide formed by the reaction of said hydrogen cyanide and said sodium hydroxide.

References Cited in the file of this patent

UNITED STATES PATENTS 2,711,991    Hrubesch et al. _____ June 28, 1955